Figure 1:
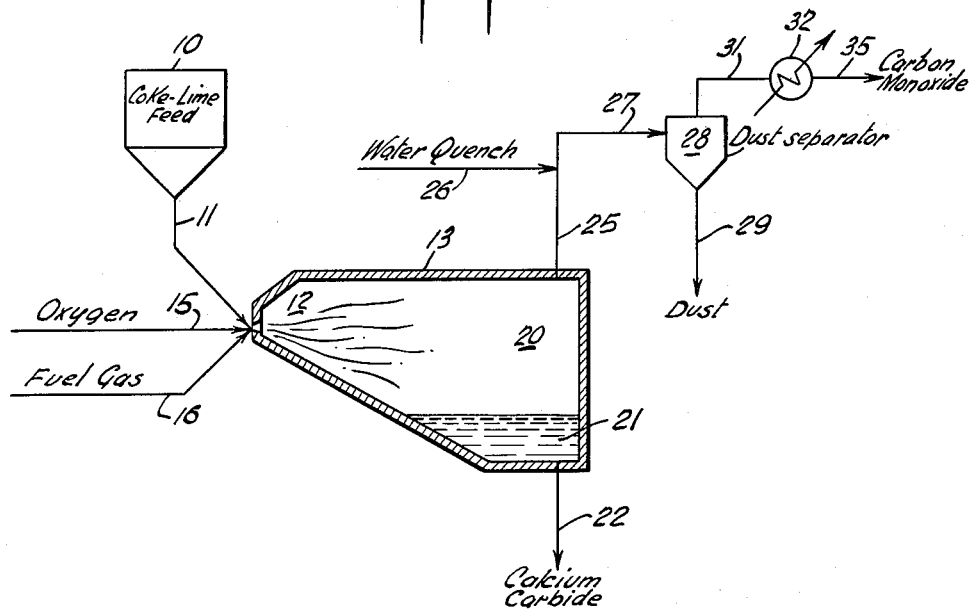

Jan. 16, 1962  H. V. ATWELL  3,017,244

OXY-THERMAL PROCESS

Filed May 9, 1958

United States Patent Office
3,017,244
Patented Jan. 16, 1962

3,017,244
OXY-THERMAL PROCESS
Harold V. Atwell, Fishkill, N.Y., assignor to Texaco Inc., a corporation of Delaware
Filed May 9, 1958, Ser. No. 734,326
7 Claims. (Cl. 23—78)

This invention relates to a method and apparatus for effecting oxy-thermal reactions. In one of its more specific aspects, it is directed to a process for the manufacture of calcium carbide or calcium cyanamide wherein particles comprising carbonaceous solid and calcareous solid are contacted with an oxygen-containing gas as a gaseous suspension in an unpacked conversion zone autogenously maintained at a temperature within the range of about 3000 to about 5000° F. Calcium carbide product from the conversion zone may be withdrawn or contacted with nitrogen to effect cooling and reaction to form calcium cyanamide.

In one embodiment of the process of this invention lime is contacted with heavy oil under cracking conditions to form particles comprising coke and lime, particles of coke and lime are withdrawn from the cracking zone and passed to a burning zone where they are heated by combustion with air, a portion of the heated coke-lime particles in the burning zone is withdrawn and contacted with oxygen as a suspension in an oxy-thermal reaction zone to form calcium carbide. Droplets of calcium carbide in the oxy-thermal reaction zone are contacted with nitrogen to effect cooling and conversion of the calcium carbide to calcium cyanamide which is separated as a solid.

Calcium carbide is usually prepared by heating a mixture of pulverized lime and coke in an electric furnace. Recently, attempts have been made to produce calcium carbide by processes wherein the high temperature required is generated by reacting coke and lime in a blast furnace in contact with oxygen, for example, U.S. Patent 2,738,256, issued to Willem van Loon, March 13, 1956, describes a process in which a mixture of lumps of fuel and limestone is introduced into the top of a shaft furnace and oxygen is introduced through tuyeres to produce molten calcium carbide.

In the manufacture of calcium carbide in electric furnaces, or in shaft type oxy-thermal blast furnaces, the charge to the furnace consists of a mixture of relatively large pieces of crushed coke and lime. Typically the coke and lime are crushed to about one to two inch irregularly shaped lumps. These irregularly shaped particles form compact beds containing void spaces or passages through which the reactant gases pass. The large particles employed require considerable time in preheating, present little surface for reaction and react slowly. Particles finer than about 1/10 inch are objectionable in the furnace feed since they tend to be lost by entrainment and tend to clog or block the passages through the bed causing explosive disturbances of the bed. These fine particles must be separated and briquetted for inclusion in the furnace charge.

In accordance with the process of this invention, lime and carbon in the form of fine particles of conglomerate coke and lime are reacted as a suspension in gaseous reactants and reaction products in a flow type generator to form calcium carbide. In applicant's process, fine particles are not only found to be suitable but are found to achieve definite advantages. For example, the reactants are in close association and all of the reactants are close to the surface of the particle. Mass transfer of the reactants is rapid since the distance between reactants is small and heat transfer from the surface of the particle to the reactants is rapid since the distance through which the heat must be transferred is small.

The conglomerate particles used in this process comprise carbonaceous and calcareous constituents. The calcareous constituent may be, for example, slaked or unslaked lime, limestone or dolomite. Unslaked lime is a preferred calcareous material and is referred to for convenience hereinafter as lime. The carbonaceous constituent of the particle may comprise coke, coal, hydrocarbon oils or pitches. Generally solid carbonaceous substances, for example, coke or liquid hydrocarbons which are converted to coke upon heating are preferred. The conglomerate particles used in this process, preferably, have a particle size within the range of about 20 to 200 mesh (Tyler Standard Screen). Each particle contains lime and at least the stoichiometric amount of carbon required for reaction to produce calcium carbide. Additionally the particle may contain carbon to supply at least a part of the fuel reacted with the oxygen to produce the high temperature of the oxy-thermal process. Alternatively, if the conglomerate particles contain only the stoichiometric amount of carbon for the carbide reaction or less than the fuel requirements, an auxiliary fuel may be employed, for example, fuel gas, fuel oil, or coal. An auxiliary fuel may be introduced into the oxy-thermal reactor separately or may be combined with or deposited on the conglomerate coke-lime particles.

The conglomerate particles may be formed by grinding or milling together fine particles of the carbonaceous and calcareous constituents or by depositing the carbonaceous constituent upon a nucleus of the calcareous constituent. Carbon in the form of coke may be deposited upon lime by cracking a hydrocarbon in the presence of the lime particles. Gaseous hydrocarbons, for example, methane or natural gas may be cracked in the presence of lime at temperatures within the range of about 1500 to 2100 °F. to form a conglomerate of coke and lime. Hydrocarbon oils, for example, residual petroleum oils, may be cracked in the presence of finely divided particles of lime in a fluidized bed coking process. The coke-lime conglomerate from a burning zone of a fluid coking process is a preferable feed material for this process since it is produced at high temperature and may be used directly in this process.

Since a large part of the carbonaceous fuel and the oxygen passed to the oxy-thermal reaction zone are consumed in supplying heat thereto, it is desirable to exclude diluents from the reaction zone. It is therefore preferable that the oxygen be of high purity. Commercially pure oxygen comprising about 95 percent oxygen is readily obtained by the rectification of air and is a preferred source of oxygen for the process of this invention. Nitrogen produced in the air rectification step may be advantageously employed as a quench medium and as a reactant to convert a part or all of the calcium carbide produced to calcium cyanamide.

The reaction of coke and lime to produce calcium carbide is effected at temperatures within the range of about 3000 to 5000° F. It is prefered to effect the foregoing reactions at a temperature of about 4500° F. in the oxy-thermal process of this invention. The products of reaction comprise liquid calcium carbide and gaseous products including carbon monoxide and carbon dioxide. If hydrogen is present as a component of the fuel, hydrogen or water vapor or both are also found in the gaseous products. Molten calcium carbide is withdrawn and cast into pigs which are cooled to solidify the calcium carbide. Gaseous products are separated, and withdrawn for process or fuel use after removal of entrained particles. Large amounts of steam may be generated in waste heat boilers in cooling the product gases.

An advantage of the process of this invention is that the coke and lime reactants are maintained in intimate contact greatly reducing the distances through which mass transfer must be effected.

Another advantage of this invention is that all of the reactants are very near the surface of the particles so that the distances through which heat must be transferred are very small.

Another advantage of the process of this invention is that rapid reaction rates result from the short distances through which mass and heat are transferred.

Another advantage of the process of this invention is that fine particles may be employed without encountering the loss of particles from the reaction zone or explosive disruptions of the reaction zone caused by blocking of gas passages when fine particles are employed in compact beds of electric furnace or shaft furnace carbide processes.

Another advantage of the process of this invention is that high purity calcium carbide may be produced from carbonaceous fuels containing little or no ash.

Having set forth its general nature, the invention will be best understood from the more detailed description hereinafter which refers to the accompanying drawings wherein FIGURE 1 describes one form of the process of this invention for the oxy-thermal reaction of coke-lime conglomerates. FIGURE 2 illustrates another form of the process of this invention incorporating preparation of conglomerate coke-lime particles in a fluid coking process and quenching of the oxy-thermal reaction products with nitrogen to produce calcium cyanamide. Although the drawings illustrate arrangements of apparatus in which the process of this invention may be practiced, it is not intended to limit the invention to the particular apparatus or materials described.

Figure 2:
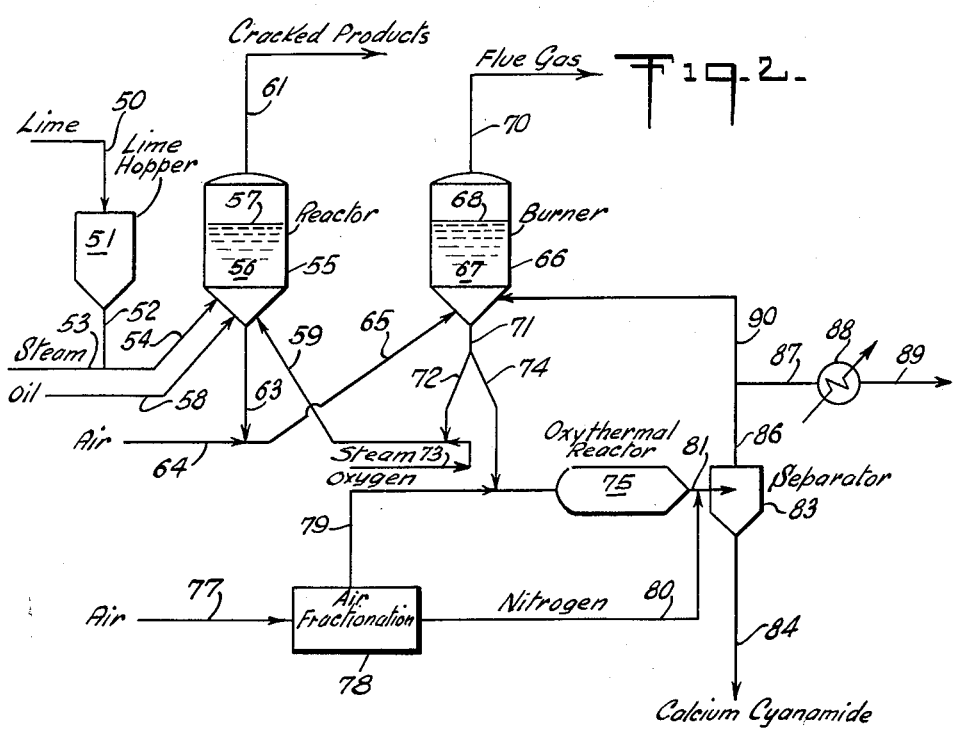

Referring to FIGURE 1, coke-lime conglomerate particles comprising about 36 weight percent coke and 64 percent lime in hopper 10 are fed at a controlled rate through line 11 to the burning zone 12 of oxy-thermal reactor 13. Oxygen in line 15 and fuel gas, for example, methane, in line 16 are admitted to burning zone 12 in admixture with the coke-lime particles from line 11. The coke and lime in the coke-lime feed provide the reactants in about the stoichiometric amounts required for the production of calcium carbide. Heat to effect the oxy-thermal reaction is supplied wholly by the combustion of fuel gas with oxygen to form carbon monoxide. The oxygen and fuel gas are supplied in an amount sufficient to raise the temperature of the coke-lime particles to about 4500° F. The coke-lime particles are rapidly converted to droplets of calcium carbide in burning zone 12. Oxythermal reactor 13 contains an enlarged separating section 20 where the gas velocities are considerably decreased. The entrained droplets of calcium carbide coalesce and drop out of the gaseous combustion products and collect in a pool 21 at the bottom of oxy-thermal reactor 13. Liquid calcium carbide is tapped from oxy-thermal reactor 13 through line 22 and is cast into pigs which may be cooled and solidified for handling. Gaseous combustion products are withdrawn through line 25 and quenched with a water spray introduced through line 26 to a temperature below about 3000° F. to solidify any mist of calcium carbide which may be entrained from separating zone 20. The quenched gases are passed through line 27 to dust separator 28 wherein any solids are removed and discharged through line 29 for disposal.

Dust-free gas is withdrawn through line 31 and passed to cooler 32 which may comprise a waste heat boiler for the generation of steam or heat exchange means for preheating the oxygen, fuel gas, or other processing streams. Cooled carbon monoxide is discharged through line 35 for use as a chemical reactant or a fuel as desired.

In the embodiment of this invention shown in FIGURE 2, coke-lime conglomerate is formed in a fluidized coking process. In the fluidized coking process a heavy oil, for example, a petroleum residual oil, is cracked by contacting with highly heated coke particles in a dense turbulent fluidized bed. Heat for the cracking operation may be supplied in part by heating the oil feed before introduction into the coking zone but the greatest amount of heat is introduced as sensible heat of the coke particles. In the cracking zone the oil is dispersed upon the surface of the coke particles, where it is cracked to vaporous products and a solid residue which adheres to the surface of the coke particle. Coke is continuously withdrawn from the reaction zone and passed to a burning zone wherein a part of the deposited carbonaceous residue is burned by contact with an oxygen-containing gas, for example, air. In typical coking operations the cracking temperature may be selected from within the range of about 850 to 1100° F. and the temperature of the burning zone is selected from a temperature within the range of about 950 to 1500° F. In the course of the cracking operation a greater amount of carbonaceous solid is deposited upon the coke particles than is consumed in the burning zone with the result that the particles continuously increase in size and the net coke production is continuously withdrawn. In order to provide additional nuclei for the replacement of particles withdrawn from the system, finely ground coke or inert solid is added. Pulverized lime having a particle size such that at least 90 percent passes a 100 mesh Tyler Standard Screen provides an excellent source of coke nuclei. The pulverulent lime is introduced into the reaction zone, and a carbonaceous coating is built up by repeated applications of oil, cracking, and burning. The particles thus formed comprise a lime nucleus with a carbonaceous shell. The relative amount of carbon and lime may be controlled as desired by adjustment of the relative rates of lime addition and coke-lime conglomerate withdrawal. The coke-lime conglomerate produced by fluid coking is a highly desirable feed stock for oxy-thermal conversion to calcium carbide since it may be withdrawn from the burning zone at high temperatures and passed directly to an oxy-thermal reactor.

With reference to FIGURE 2, pulverized lime in line 50 is introduced into lime hopper 51. Lime is withdrawn from hopper 51 through standpipe 52 at a controlled rate and is transported by steam in line 53 through riser 54 to fluid coking reactor 55. A dense fluidized bed of coke-lime particles 56 having a surface 57 is maintained in reactor 55. Oil feed is introduced through line 58 and highly heated coke-lime particles from the burning zone are introduced through line 59. In fluidized bed 56 the oil, lime and coke-lime particles are contacted to effect cracking of the oil and deposition of carbonaceous solid or coke on the lime and the coke-lime particles. The cracked products are withdrawn as a vapor through line 61 and discharged to conventional fractionation equipment, not shown, for the separation of various products, for example, fuel oil, gasoline, and fuel gas. Coke-lime particles are withdrawn from fluid bed 56 through line 63 and transported by air from line 64 through riser 65 to coke burner 66. A dense fluidized bed of coke particles 67 having a surface 68 is maintained in burner 66. In fluid bed 67, oxygen fom the air consumes a portion of the coke deposited on the surface of the particles with an increase in the temperature of the particles. Flue gas is withdrawn through line 70 and discharged to the atmosphere. Obviously heat may be extracted from the hot flue gas by passing the gas through waste heat boilers or heat exchange equipment not shown. Highly heated coke-lime particles from bed 67 are withdrawn through standpipe 71. A portion of the withdrawn coke-lime particles is passed to standpipe 72 and recycled to reactor 55 with steam from line 73 through riser 59.

Another portion of the withdrawn coke-lime particles is withdrawn through standpipe 74 and passed to the inlet of oxy-thermal reactor 75. Air in line 77 is fractionated in air fractionator 78 to separate oxygen, withdrawn through line 79, and nitrogen, withdrawn through line 80. The oxygen in line 79 is passed to the inlet of oxy-thermal reactor 75 where the oxygen and highly heated coke-lime particles are admixed to form a suspension of particles in oxygen. The oxygen reacts with a portion of the carbon component of the coke-lime particles to raise the temperature of the particles to about 4500° F. Lime and unconsumed carbon in the particles react to form droplets of calcium carbide suspended in the reactant gases. Reaction products are discharged through line 81 where they are immediately contacted with nitrogen from line 80 to effect quenching to a temperature within the range of about 1475 to 1800° F. The fine particles and droplets of calcium carbide react with the nitrogen to form solid calcium cyanamide. The suspension of calcium cyanamide is introduced into separator 83 wherein the solid calcium cyanamide is separated from the gaseous reactants and withdrawn through standpipe 84 to cooling and storage facilities not shown.

Separated hot reactant gases containing a large proportion of carbon monoxide is withdrawn from separator 83 through lines 86 and 87, waste heat boiler 88 and line 89 to chemical or fuel uses not shown. A portion of the carbon monoxide containing gas may be passed through line 90 to coke burner 66 to provide a portion of the combustion heat required in burner 66 thereby reducing the amount of deposited carbonaceous solid consumed in the generation of heat. In the embodiment described the coke-lime particles contain sufficient coke to supply the stoichiometric amount of carbon for reaction with the lime to produce calcium carbide and additionally sufficient carbon to provide the fuel for the oxy-thermal reaction. If desired the amount of carbon in the particles may be reduced and an auxiliary fuel substituted, for example, a portion of the cracked products separated from coking reactor 55.

*Example*

A coke-lime composite is produced by fluidized bed coking of a heavy oil comprising virgin and cracked residual oils in the presence of lime nuclei. Feed rates and burning conditions are controlled to produce coke-lime composite particles having a composition of 79 percent coke and 21 percent lime and a particle size such that 90 percent passes a 48 mesh Tyler Standard Screen. Coke-lime composite is withdrawn from the fluid coking burning zone at a temperature of 1200° F. and passed with oxygen at a rate of 10.4 standard cubic feet of oxygen per pound of coke-lime composite directly to an oxythermal reaction zone. The oxygen, coke and lime as a gaseous suspension react to maintain an autogenous temperature of 3990° F. and produce 0.24 pound of calcium carbide and 22.1 standard cubic feet of carbon monoxide per pound of coke-lime composite charged. Molten calcium carbide is separated from the gaseous carbon monoxide product and is cast into pigs which are cooled, crushed and sized by usual methods.

Obviously many modifications and variations of the invention, as hereinbefore set forth, may be made without departing from the spirit and scope thereof and, therefore, only such limitations should be imposed as are indicated in the appended claims.

I claim:
1. A process for the production of calcium cyanamide which comprises reacting a carbon-lime composite in fine particle form comprising coke and lime and consisting of at least 0.6 part of carbon per part of lime with an oxygen stream in an unpacked reaction zone wherein said particles are suspended in gaseous reactants and resulting gaseous reaction products and reacted while in suspension to form calcium carbide at an autogenously maintained temperature within the range of about 3000 to about 5000° F. by reaction of a portion of said coke with oxygen, quenching the products from said reaction zone with a nitrogen stream to a temperature within the range of about 1475 to 1800° F. with concomitant formation of calcium cyanamide and separating solid calcium cyanamide from the quenched products.

2. A combined coking and oxy-thermal process which comprises contacting lime and a heavy oil under cracking conditions in a fluidized bed cracking zone to form coke-lime particles containing at least 0.6 part of carbon per part of lime, passing coke-lime particles from said cracking zone to a burning zone, contacting said coke-lime particles in said burning zone with air to effect heating of said coke-lime particles to a temperature within the range of about 950 to 1500° F., passing at least a part of said heated coke-lime particles to an oxy-thermal reaction zone as a gaseous suspension wherein oxygen and a combustible are reacted to maintain a reaction temperature within the range of about 3000 to about 5000° F., and withdrawing products comprising carbon monoxide and calcium carbide.

3. A process for the manufacture of calcium cyanamide which comprises contacting lime and a heavy oil under cracking conditions in a fluidized bed cracking zone to form coke-lime particles containing at least 0.6 part of carbon per part of lime, passing coke-lime particles from said cracking zone to a burning zone, contacting said coke-lime particles in said burning zone with air to effect heating of said coke-lime particles to a temperature within the range of about 950 to 1500° F., passing at least a part of said heated coke-lime particles to an oxy-thermal reaction zone as a gaseous suspension wherein oxygen and a combustible are reacted to maintain a reaction temperature within the range of about 3000 to about 5000° F., quenching the products from said reaction zone with nitrogen to a temperature within the range of about 1475 to 1800° F. with concomitant formation of calcium cyanamide, and separating solid calcium cyanamide from the quenched products.

4. A process according to claim 1 wherein the size of said carbon-lime composite particles is within the range of about 20 mesh to 200 mesh, Tyler Standard Screen Scale.

5. The process of claim 1 wherein the temperature in said reaction zone is about 4000 to 4500° F.

6. A process according to claim 2 wherein an auxiliary carbonaceous fuel is supplied to said reaction zone.

7. In a process for producing calcium carbide by reaction of lime and carbonaceous solid at elevated temperature provided by partial combustion of a carbonaceous fuel, the improvement which comprises reacting oxygen and a composite carbon-lime solid in fine particle form comprising lime and carbon and containing at least 0.6 part carbon per part lime by weight at an autogenously maintained temperature within the range of about 3,000 to about 5,000° F. in an unpacked reaction zone wherein said solid composite particles are suspended and entrained in dispersed form in oxygen and resulting gaseous reaction products and reacted while in suspension to form calcium carbide, and recovering products of reaction comprising carbon monoxide and calcium carbide.

References Cited in the file of this patent

UNITED STATES PATENTS

| | | |
|---|---|---|
| 785,161 | Frank | Mar. 21, 1905 |
| 996,011 | Frank | June 20, 1911 |
| 1,004,509 | Washburn | Sept. 26, 1911 |
| 2,380,008 | Abrams et al. | July 10, 1945 |

(Other references on following page)

UNITED STATES PATENTS

| | | |
|---|---|---|
| 2,414,625 | Abrams et al. | Jan. 21, 1947 |
| 2,687,945 | Daniels | Aug. 31, 1954 |
| 2,738,256 | Van Loon et al. | Mar. 13, 1956 |
| 2,749,219 | Koopal et al. | June 5, 1956 |
| 2,747,979 | Daniels et al. | July 2, 1957 |
| 2,869,990 | Burgess | Jan. 20, 1959 |
| 2,880,069 | Koopal | Mar. 31, 1959 |

FOREIGN PATENTS

| | | |
|---|---|---|
| 688,188 | Great Britain | Feb. 25, 1953 |

OTHER REFERENCES

Fluidized Solids, Chem. Eng., May 1953, pages 219, 220, 225, 227, 229, 230.

Jour. of Chem. Education, vol. 24, #6, page 306.

Kalbach: Article in Chem. and Metallurgical Eng., June 1944, pages 94–98.